(12) United States Patent
Kawamoto

(10) Patent No.: US 7,783,325 B2
(45) Date of Patent: Aug. 24, 2010

(54) TRANSMISSION AND RECEPTION FORWARDING SYSTEM

(75) Inventor: Yoji Kawamoto, Tokyo (JP)

(73) Assignee: Sony Corporation, Tokyo (JP)

( * ) Notice: Subject to any disclaimer, the term of this patent is extended or adjusted under 35 U.S.C. 154(b) by 465 days.

(21) Appl. No.: 11/421,611

(22) Filed: Jun. 1, 2006

(65) Prior Publication Data

US 2006/0276224 A1 Dec. 7, 2006

(30) Foreign Application Priority Data

Jun. 3, 2005 (JP) ............................. 2005-164464

(51) Int. Cl.
*H04B 1/38* (2006.01)
(52) U.S. Cl. .................. 455/557; 455/556; 455/575
(58) Field of Classification Search ............. 370/401, 370/392, 466, 355, 420; 455/420, 445, 11.1, 455/557

See application file for complete search history.

(56) References Cited

U.S. PATENT DOCUMENTS 6,246,688 B1 * 6/2001 Angwin et al. ............. 370/401
6,289,213 B1 * 9/2001 Flint et al. .................. 455/420
6,549,534 B1 * 4/2003 Shaffer et al. ............... 370/355
2002/0025832 A1 * 2/2002 Durian et al. ............... 455/556

FOREIGN PATENT DOCUMENTS

| JP | 2001-258071 A | 9/2001 |
| JP | 2001-274895 A | 10/2001 |
| JP | 2003-283693 A | 10/2003 |
| JP | 2004-173156 A | 6/2004 |

* cited by examiner

*Primary Examiner*—Timothy Edwards, Jr.
(74) *Attorney, Agent, or Firm*—Sonnenschein Nath & Rosenthal LLP

(57) ABSTRACT

To provide a transmission and reception system which immediately forwards data received by a cellular phone to an information processing terminal. Data received by the cellular phone is forwarded to the information processing terminal by performing communication between the cellular phone and the information processing terminal through a prescribed interface. According to this, incoming data received by the cellular phone is forwarded to the information processing terminal even when a user does not perform a forwarding request of the information processing terminal, therefore, the user can immediately check the data received by the cellular phone.

3 Claims, 4 Drawing Sheets

FIG. 4 home-telnum: XX-XXXX-XXXX —— 41 cell-telnum: XXX-XXXX-XXXX —— 42 company-telnum: XXX-XXXX-XXXX —— 43 cell-email-address: Bsan@cell.ne.jp —— 44 company-email-address: Bsan@bsan.com —— 45

TRANSMISSION AND RECEPTION FORWARDING SYSTEM

CROSS REFERENCES TO RELATED APPLICATIONS

The present invention contains subject matter related to Japanese Patent Application JP 2005-164464 filed in the Japanese Patent Office on Jun. 3, 2005, the entire contents of which being incorporated herein by reference.

BACKGROUND OF THE INVENTION

1. Field of the Invention

The invention relates to a transmission and reception forwarding system including a cellular phone and an information processing terminal.

2. Description of the Related Art

Currently, incoming data of an e-mail and the like received by a cellular phone is forwarded to an information processing terminal through an interface such as USB, and contents of the incoming data is browsed at the side of the information processing terminal. It is necessary in related arts that the information processing terminal requests the cellular phone to forward the data for performing the forwarding processing.

Patent Document: JP-A-2001-258071

SUMMARY OF THE INVENTION

Incoming data such an e-mail and the like received by a cellular phone has high immediacy. However, in related arts, when the cellular phone forwards the received incoming data to an information processing terminal, it is necessary that the information processing terminal requests the cellular phone to forward the data, therefore, a user could not check the incoming data received by the cellular phone immediately when using the information processing terminal.

The invention has been proposed in view of actual conditions in the past, and it is desirable to provide a transmission and reception forwarding system in which the user can immediately check data received by the cellular phone at the side of the information processing terminal.

A transmission and reception forwarding system according to an embodiment of the invention includes a cellular phone and an information processing terminal which communicates with the cellular phone through a prescribed interface, in which incoming data received by the cellular phone is forwarded to the information processing terminal.

BRIEF DESCRIPTION OF THE DRAWINGS

FIG. 4 is a table showing a communication address list.

DETAILED DESCRIPTION OF THE INVENTION

Hereinafter, a transmission and reception forwarding system 1 to which the invention is applied will be explained in detail with reference to the drawings.

Figure 1:
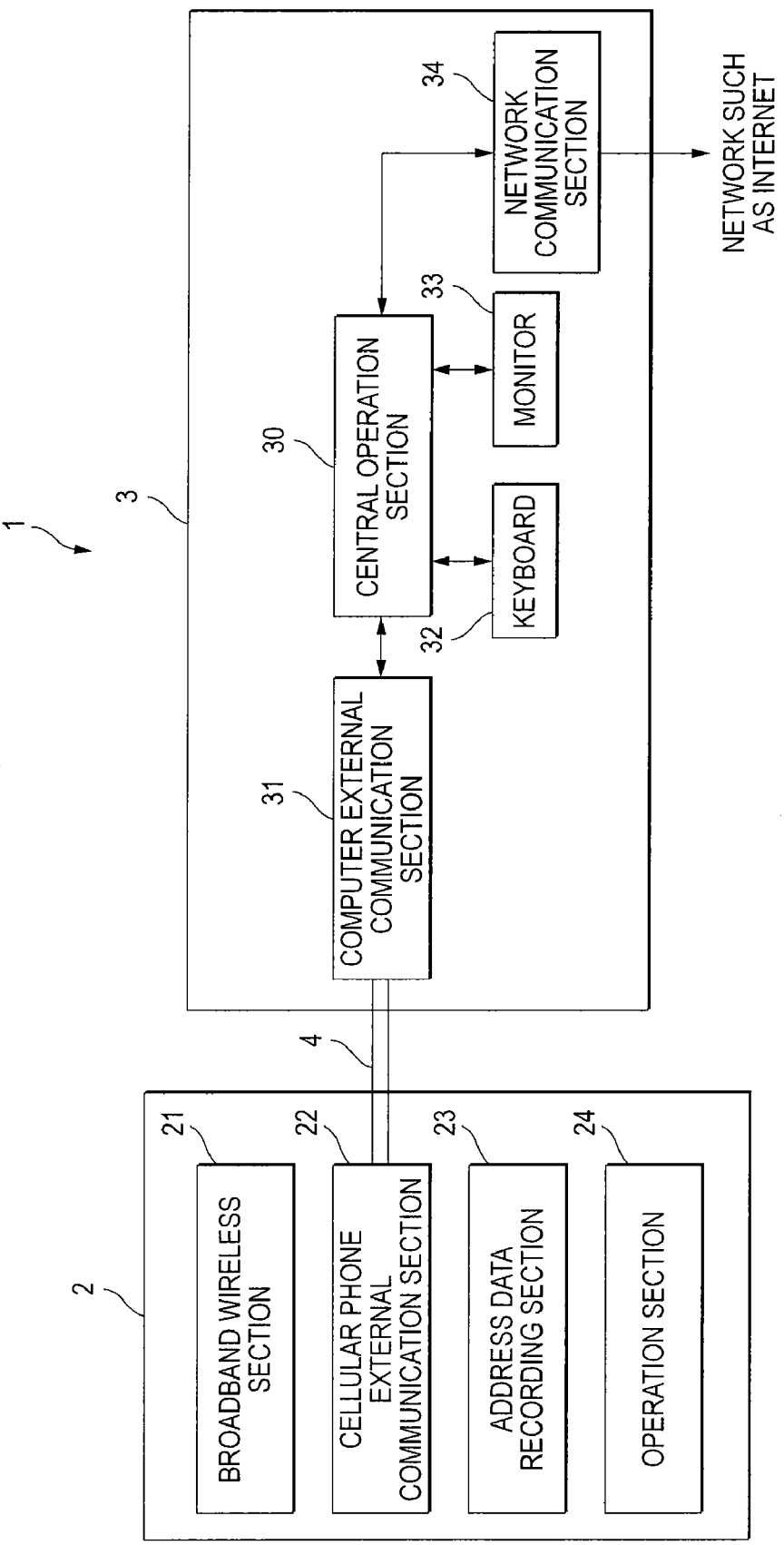
FIG. 1 is a configuration diagram showing a transmission and reception forwarding system.

FIG. 1 is a configuration diagram showing the transmission and reception forwarding system 1 to which the invention is applied.

The transmission and reception forwarding system 1 includes a cellular phone 2, a computer 3, and a communication cable 4 which connects the cellular phone 2 to the computer 3 for performing communication as shown in FIG. 1.

The cellular phone 2 is a portable communication device transmitting and receiving incoming data of voice calls and e-mails through a wireless telephone network. The cellular phone 2 has a broadband wireless section 21, a cellular phone external communication section 22, an address data recording section 23, and an operation section 24.

The broadband wireless section 21 transmits and receiving voice calls and e-mails through the wireless telephone network.

The cellular phone external communication section 22 performs communication with the computer 3 through the communication cable 4.

The address data recording section 23 is a rewritable recording medium. A user resisters telephone numbers and e-mail addresses other than the user's ones in the address data recording section 23.

The operation section 24 is an input device in which the user operates various kinds of functions of the cellular phone 2.

The user of the cellular phone 2 can transmit and receive voice calls and e-mails when not communicating between the cellular phone 2 and the computer 3. However, according to the transmission and reception forwarding system 1 of the embodiment, the user can obtain the following operative effect by performing communication between the cellular phone 2 and the computer 3.

In addition, the cellular phone 2 includes cellular phone transmission and reception program data which controls communication with the computer 3 connected through the communication cable 4. The cellular phone transmission and reception program data is necessary when performing forwarding operation by connecting cellular phone 2 to the computer 3, and it is not necessary when the user uses the cellular phone 2 independently.

The computer 3 includes a central operation section 30, a computer external communication section 31, a keyboard 32, a monitor 33 and a network communication section 34.

The central operation section 30 controls data communication and the like with the computer external communication section 31, the keyboard 32, the monitor 33 and the network communication section 34.

The computer external communication section 31 communicates with the cellular phone 2 through the communication cable 4.

The keyboard 32 is a data input device from which the user inputs text data.

The monitor 33 is an output device on which text data and image data are displayed.

The network communication section 34 performs communication through a network such as the Internet and the like.

The computer 3 also includes computer transmission and reception program data which controls communication with the cellular phone 2 connected through the communication cable 4.

The communication cable 4 connects the cellular phone external communication section 22 to the computer external communication section 31. For example, there are an USB (Universal serial bus) cable and the like. It is also possible to use wireless communication such as Bluetooth, not limited to wire communication.

Figure 2:
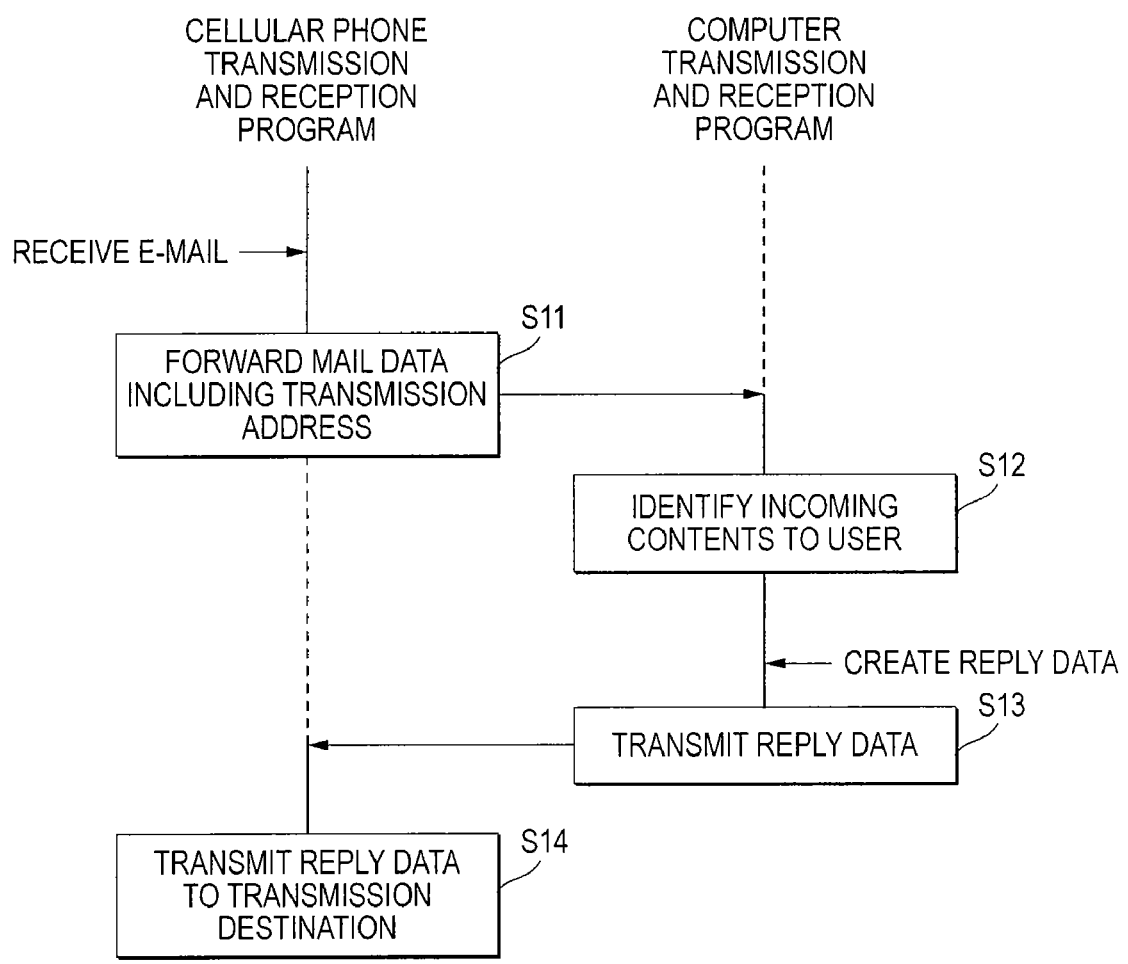
FIG. 2 is a flow chart explaining processing when receiving an e-mail in the transmission and reception forwarding system.

Concrete operation contents of the transmission and reception forwarding system 1 when the cellular phone 2 receives an e-mail will be explained with reference to a flow chart of FIG. 2. In the flow chart of FIG. 2, a left side shows a temporal flow of operations of the cellular phone 2 corresponding to description of the cellular phone transmission and reception program data, and a right side shows a temporal flow of operations of the computer 3 corresponding to description of the computer transmission and reception program data.

When the cellular phone 2 receives an e-mail, the cellular phone external communication section 22 forwards forwarding data in which header information such as a transmission source e-mail address are included in an e-mail body to the computer 3 through the communication cable 4 in accordance with an instruction described in the cellular phone transmission and reception program data in step S11.

When the forwarding data is forwarded from the cellular phone 2 to the computer 3, the central operation section 30 performs interrupt processing with respect to a program executed by the computer 3, which displays a reception notification of the forwarding data at the monitor 33 in accordance with an instruction described in the computer transmission and reception program data in step S12. The user can immediately check the reception notification of the e-mail displayed at the monitor 33 by the interrupt processing.

Accordingly, the user can immediately check the data received by the cellular phone 2 even when a forwarding request of the received data by the cellular phone 2 is not performed by using the computer 3.

Subsequently, when the user creates text data using the keyboard 32, the computer external communication section 31 transmits reply data to the cellular phone 2 through the communication cable 4 in accordance with an instruction described in the computer transmission and reception program data in step S13. When the cellular phone 2 receives the reply data from the computer 3, the cellular phone external communication section 22 transmits the reply data to the transmission destination using the broadband wireless section 21 in accordance with an instruction described in the cellular phone transmission and reception program data in step S14.

The user can create not only the reply by text data but also voice data using a microphone, and it is possible to transmit the voice data as an attachment file of the e-mail to the transmission destination. Furthermore, the user can also select that the created voice data is converted into text data. When the user selects that the voice data is converted into text data, the computer external communication section 31 converts the created voice data into text data.

Figure 3:
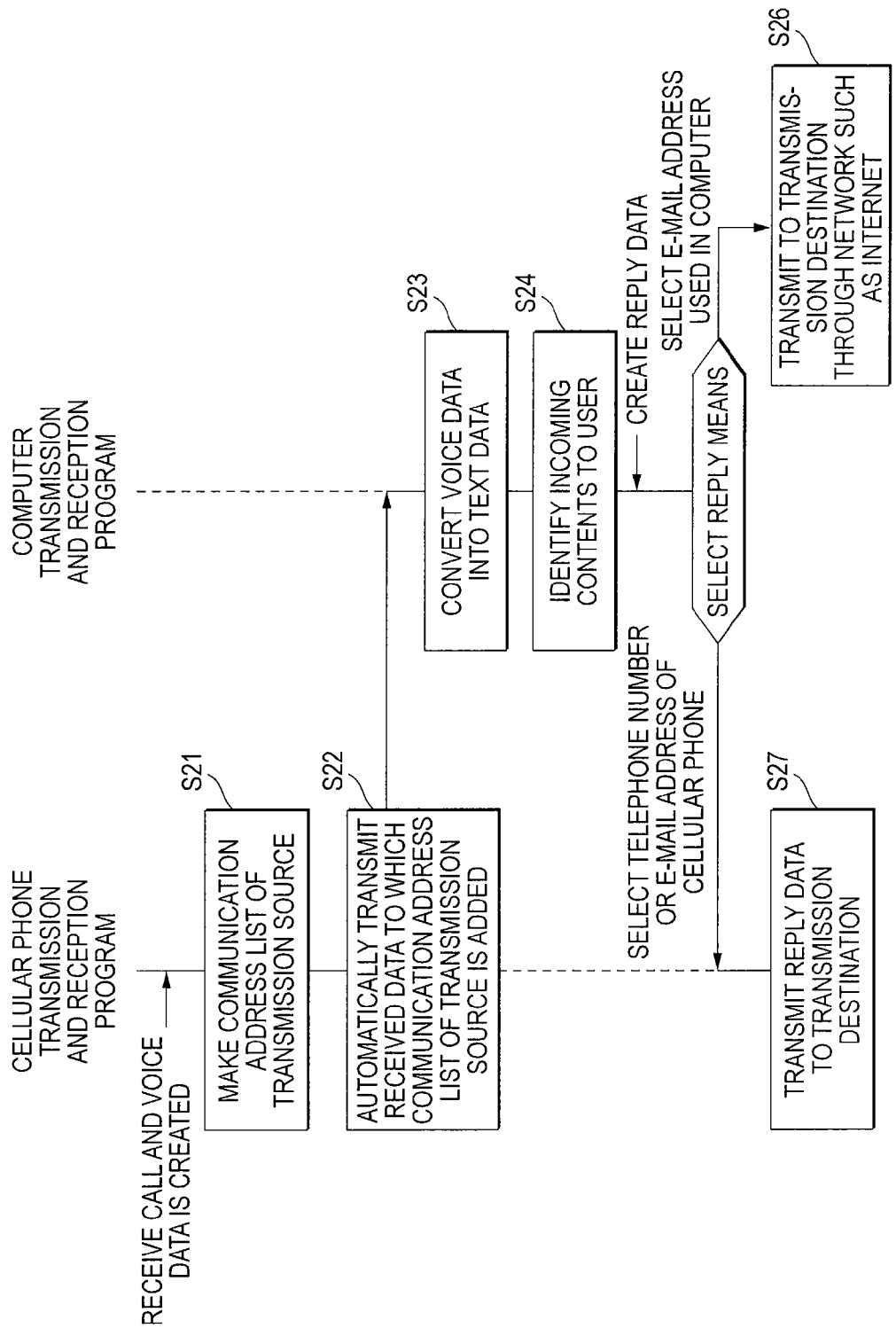
FIG. 3 is a flow chart explaining processing when receiving a voice call in the transmission and reception forwarding system.

Next, concrete operation contents of the transmission and reception forwarding system 1 when the cellular phone 2 receives a voice call will be explained with reference to a flow chart of FIG. 3. In the flow chart of FIG. 3, a left side shows a temporal flow of operations of the cellular phone 2 corresponding to description of the cellular phone transmission and reception program data, and a right side shows that a temporal flow of operations of the computer 3 corresponding to description of the computer transmission and reception program data.

First, the cellular phone 2 receives a voice call and creates voice data using an answer-phone function. The term answer-phone function here is a function of recording voice data as a message of a transmitter in the case that the user does not respond when the cellular phone 2 receives a voice call. When voice data is created by the answer-phone function, the cellular phone external communication section 22 identifies a transmission source and makes a communication address list of the transmission source using the address data recording section 23 in accordance with an instruction described in the cellular phone transmission and reception program data in step S21. The term communication address list here is information of all telephone numbers and e-mail addresses concerning the transmission-sources registered in the address data recording section 23. For example, as shown in FIG. 4, when a voice call from Mr. B is received at the Mr. A's cellular phone, the communication address list identified from the address data recording section of Mr. A's cellular phone has 5 kinds of numbers and addresses, namely, a telephone number 41 of Mr. B's home, a telephone number 42 of Mr. B's cellular phone, a telephone number 43 of Mr. B's office, an e-mail address 44 of Mr. B's cellular phone and an e-mail address 45 used at a computer by Mr. B.

Subsequently, the cellular external communication section 22 forwards forwarding data to the computer 3 through the communication cable 4, in which the communication address list of the transmission source is added to the voice data which has been created by the answer-phone function in accordance with an instruction described in the cellular phone transmission and reception program data in step S22.

Next, when the computer 3 receives the forwarding data from the cellular phone 2, the central operation section 30 converts the voice data to text data in accordance with an instruction described in the computer transmission and reception program data in step S23. After the voice data is converted into text data, the central operation section 30 performs interrupt processing with respect to a program used by the user, which displays a reception notification of the forwarding data including the communication address list at the monitor 33 in accordance with an instruction described in the computer transmission and reception program data in step S24, thereby allowing the user to immediately check the incoming notification received by the cellular phone 2.

The conversion of the data format is not limited to the case performed in the computer external communication section 31 but may be performed in the cellular phone external communication section 22. As a means of notifying the user of the reception by the cellular phone 2, a speaker outputting voice data may be used instead of using the monitor 33, without converting voice data into text data. In addition, when the cellular phone 2 receives an e-mail, the central operation section 30 may make not only the e-mail address but also the above communication address list of the transmission source to be notified to the user by using the computer transmission and reception program data.

Accordingly, since the communication address list is notified to the user, the user can reply using the communication address list even if there is not address information of the transmission source in the computer 3 which is communicating with the cellular phone 2. In addition, voice calls and e-mails received by the cellular phone 2 are transmitted to the computer 3 to be notified to the user, as a result, the user can immediately check the incoming notification of the cellular phone 2 in the computer 3 and can browse the reception contents.

Subsequently, in the case that the user reply to the voice data received by the cellular phone 2, first, the user creates text data using the keyboard 32. The user selects from a reply means using a telephone number or an e-mail address of the cellular phone 2 and a reply means replying from the e-mail address used in the computer 3 through the network communication section 34 of the computer 3, in accordance with instructions described in the computer transmission and reception program data in step S25. When the user selects the reply means using the telephone number or the e-mail address of the cellular phone 2, the computer external communication section 31 transmits reply data created by the key board 32 to the cellular phone 2 through the communication cable 4. On the other hand, the user selects the reply means of the e-mail address used in the computer 3, the reply data is transmitted to the transmission destination from the network communication section 34 through a network such as Internet in step S26.

When the cellular phone 2 receives the reply data, the cellular phone external communication section 22 sends the reply data to the designated transmission destination in accordance with an instruction described in the cellular phone transmission and reception program data in step S27.

As a means of creating reply data, it is not limited to the case of creating the reply data in a text format using the key board 32 but a voice format using a microphone is also preferable. Additionally, the user may transmit voice by converting the text data created by the keyboard 32 into voice data according to the computer transmission and reception program data, using a telephone number of the cellular phone 2.

In the case that the cellular phone 2 receives a voice call, when the user selects an off-hook button displayed on the monitor 33 during an incoming call, not using the answerphone function, it may be possible that voice of a person who is calling is converted into the text format, and the converted text data is displayed on the monitor 33. Furthermore, the user can immediately check incoming contents, and creates reply data to be converted into voice data, thereby performing real-time communication in which the reply data converted into voice data in the cellular phone 2 is immediately transmitted to the person who is calling.

As described above, the user can perform reply operation with respect to calls and e-mails received by the cellular phone 2 through a network such as Internet to which the computer 3 is connected. When the user selects the cellular phone 2 as a communication means of the reply operation, the user can reply using the computer 3 without directly operating the cellular phone operation section 24 of the cellular phone 2.

The transmission and reception forwarding system according to an embodiment of the invention forwards data received by a cellular phone to an information processing terminal through a prescribed interface.

According to the above, the transmission and reception forwarding system according to the embodiment of the invention can forward the incoming data received by the cellular phone to the information processing terminal even when there is not a reception request from the information processing terminal, therefore, a user can immediately check the incoming data of the cellular phone.

It should be understood that the invention is not limited only to the above embodiment and that various modifications and alterations may occur insofar as they are within the scope not departing from the gist of the invention.

What is claimed is:

1. A transmission and reception forwarding system, comprising:
a cellular phone for receiving incoming data from a transmission source, said cellular phone comprising an address recording section for a user to register a communication address list associated with the transmission source; and
an information processing terminal which communicates with said cellular phone through a prescribed interface, wherein,
said incoming data comprises at least one of a voice call and a data message,
said communication address list comprises information of all telephone numbers and e-mail addresses concerning the transmission source registered by the user, and
said cellular phone transmits forwarding data to said information processing terminal, said forwarding data comprising said incoming data and the communication address list; and
said information processing terminal comprises
a first conversion unit which converts the incoming data forwarded from said cellular phone into a desired text or audio format; and
a notification unit which notifies a user of said information processing terminal of the incoming data and the communication address list.

2. The transmission and reception forwarding system according to claim 1,
wherein said cellular phone includes a second conversion unit which converts the incoming data into a desired data format.

3. The transmission and reception forwarding system according to claim 1,
wherein said information processing terminal comprises
an input unit which receives user input data from the user,
a communication unit which forwards the user input data to said cellular phone through the prescribed interface, and
said cellular phone transmits the user input data to a predetermined transmission destination.

* * * * *